(12) United States Patent
Statezni et al.

(10) Patent No.: US 11,395,370 B1
(45) Date of Patent: Jul. 19, 2022

(54) ENHANCING VEHICLE CONNECTIVITY USING A MODULAR TELEMATICS CONTROL UNIT

(71) Applicant: Waymo LLC, Mountain View, CA (US)

(72) Inventors: Dieter Statezni, Mountain View, CA (US); Sangram Patil, Mountain View, CA (US); Sharon Wang, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 60 days.

(21) Appl. No.: 17/002,218

(22) Filed: Aug. 25, 2020

(51) Int. Cl.
| | |
|---|---|
| *H01Q 21/28* | (2006.01) |
| *H04W 88/08* | (2009.01) |
| *H01Q 1/22* | (2006.01) |
| *H01Q 5/378* | (2015.01) |
| *H01Q 1/38* | (2006.01) |
| *H01Q 1/52* | (2006.01) |
| *H01Q 21/24* | (2006.01) |

(52) U.S. Cl.
CPC ........ *H04W 88/085* (2013.01); *H01Q 1/2291* (2013.01); *H01Q 1/38* (2013.01); *H01Q 1/521* (2013.01); *H01Q 5/378* (2015.01); *H01Q 21/24* (2013.01); *H01Q 21/28* (2013.01)

(58) Field of Classification Search
CPC ........ H01Q 21/28; H01Q 21/24; H01Q 1/521; H01Q 1/38; H01Q 5/378
See application file for complete search history.

(56) References Cited

U.S. PATENT DOCUMENTS

| | | | |
|---|---|---|---|
| 9,077,072 B2 | 7/2015 | Hyok | |
| 9,772,193 B1 | 9/2017 | Mendelson | |
| 10,008,886 B2 | 6/2018 | Leabman | |
| 10,490,346 B2 | 11/2019 | Contopanagos | |
| 2017/0054204 A1* | 2/2017 | Changalvala | ........ H01Q 1/2291 |
| 2017/0214150 A1 | 7/2017 | Zhao | |
| 2019/0346531 A1 | 11/2019 | Apostolos | |

FOREIGN PATENT DOCUMENTS

| | | |
|---|---|---|
| CN | 107914667 B | 4/2018 |
| WO | 2017044576 A1 | 3/2017 |

* cited by examiner

*Primary Examiner* — Graham P Smith
(74) *Attorney, Agent, or Firm* — McDonnell Boehnen Hulbert & Berghoff LLP

(57) ABSTRACT

Example embodiments described herein relate to enhancing vehicle connectivity using a modular telematics control unit (TCU) that includes antennas, radios, and other components positioned internally within a housing configured to couple to a vehicle. The TCU may include a first cellular radio configured to establish a wireless connection with a first cellular network using a first cellular transmission antenna and a first cellular reception antenna and a second cellular radio configured to establish a wireless connection with a second cellular network using a second cellular transmission antenna and a second cellular reception antenna. The TCU also includes a Wi-Fi radio coupled to a set of antennas and configured to provide a Wi-Fi network for passenger devices located inside the vehicle when the housing is coupled to the vehicle and one or more Bluetooth low energy (BLE) radios coupled to an antenna.

18 Claims, 10 Drawing Sheets

ENHANCING VEHICLE CONNECTIVITY USING A MODULAR TELEMATICS CONTROL UNIT

BACKGROUND

As technology advances, more vehicles are built with a telematics control unit (TCU) to provide system connectivity to the Internet and assist with vehicle tracking. A conventional TCU is typically an embedded system that includes a global positioning system (GPS) unit, an external interface for mobile communication, a processor, and memory. Because the conventional TCU module is typically placed in a vehicle's trunk or built into another vehicle system, the TCU's antenna is usually positioned on the vehicle's roof and connected via a long coaxial cable that results in signal loss during operation.

SUMMARY

The present disclosure generally relates to enhancing vehicle connectivity and operations using a modular TCU equipped with multiple internal cellular components configured to communicate with external networks simultaneously.

In one embodiment, the present application describes a system. The system includes a plurality of antennas; a plurality of radios; and a housing configured to couple to a vehicle. The plurality of antennas and the plurality of radios are positioned within the housing. The plurality of radios includes: (i) a first cellular radio configured to establish a first wireless connection with a first cellular network using a first cellular transmission antenna and a first cellular reception antenna from the plurality of antennas; (ii) a second cellular radio configured to establish a second wireless connection via a second cellular network using a second cellular transmission antenna and a second cellular reception antenna from the plurality of antennas; (iii) a Wi-Fi radio coupled to a set of antennas from the plurality of antennas and configured to provide a Wi-Fi network for passenger devices located inside the vehicle when the housing is coupled to the roof of the vehicle; and (iii) one or more Bluetooth low energy (BLE) radios, wherein each BLE radio is coupled to an antenna from the plurality of antennas.

In another embodiment, the present application describes a method. The method involves establishing, by a first cellular radio from a telematics control unit (TCU), a first wireless connection with a first cellular network. The TCU includes a plurality of radios and a plurality of antennas positioned within a housing that is configured to couple to a vehicle. The first cellular radio uses a first cellular transmission antenna and a first cellular reception antenna from the plurality of antennas to establish the first wireless connection with the first cellular network. The method also involves establishing, by a second cellular radio from the TCU, a second wireless connection with a second cellular network. The second cellular radio uses a second cellular transmission antenna and a second cellular reception antenna from the plurality of antennas to establish the second wireless connection with the second cellular network. The method further involves providing, by a Wi-Fi radio from the TCU, a Wi-Fi network for passenger devices located inside the vehicle when the TCU is coupled to the vehicle. The Wi-Fi radio uses a set of antennas from the plurality of antennas to provide the Wi-Fi network.

In yet another example, the present application describes non-transitory computer readable medium having stored therein instructions executable by one or more processors to cause a telematics control unit (TCU) to perform operations. The operations may involve one or more functions of the method described above.

A fourth embodiment may involve a system that includes various means for carrying out each of the operations of the first, second, and third embodiments.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
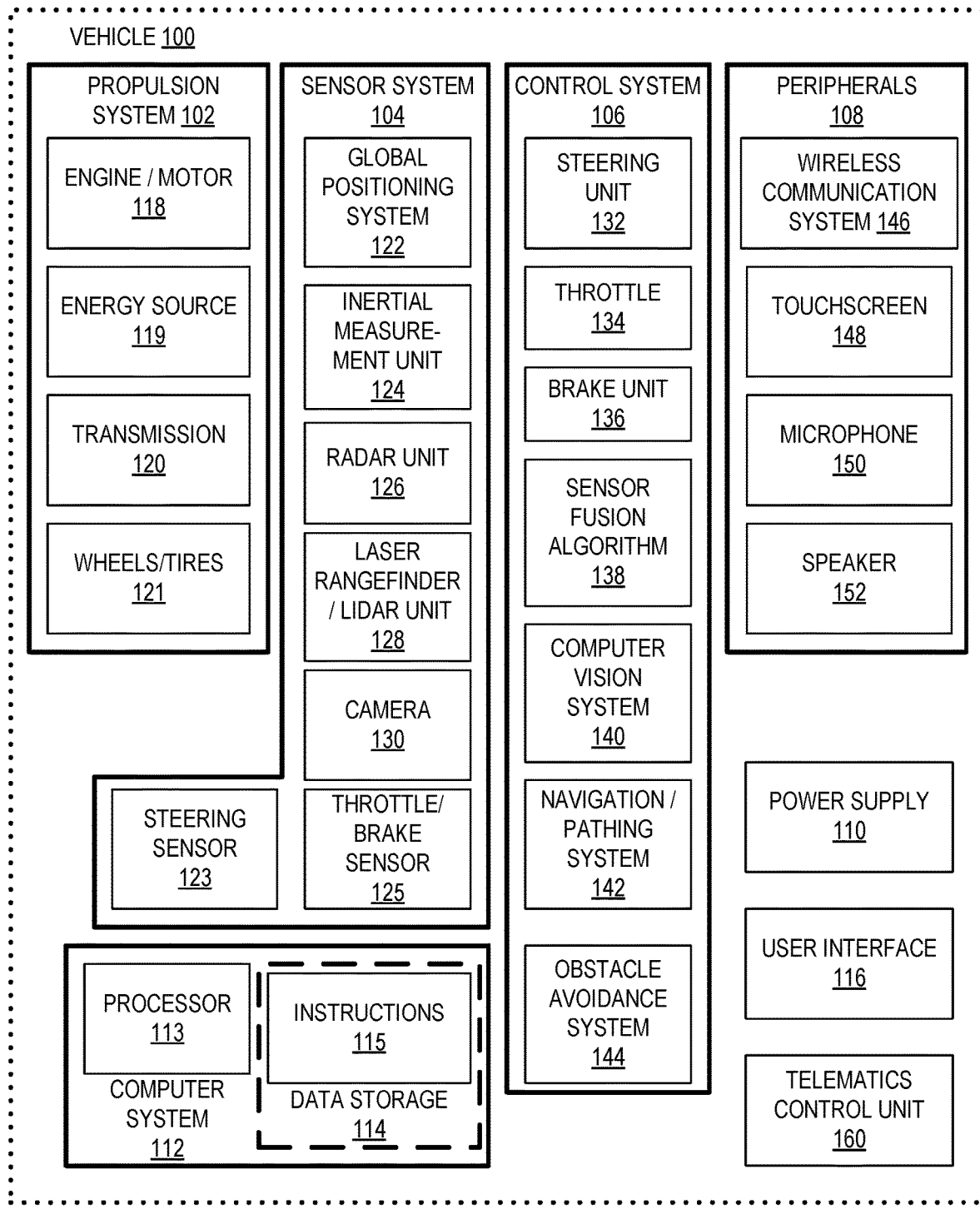
FIG. 1 is a functional block diagram illustrating a vehicle, according to one or more example embodiments.
Figure 2A:
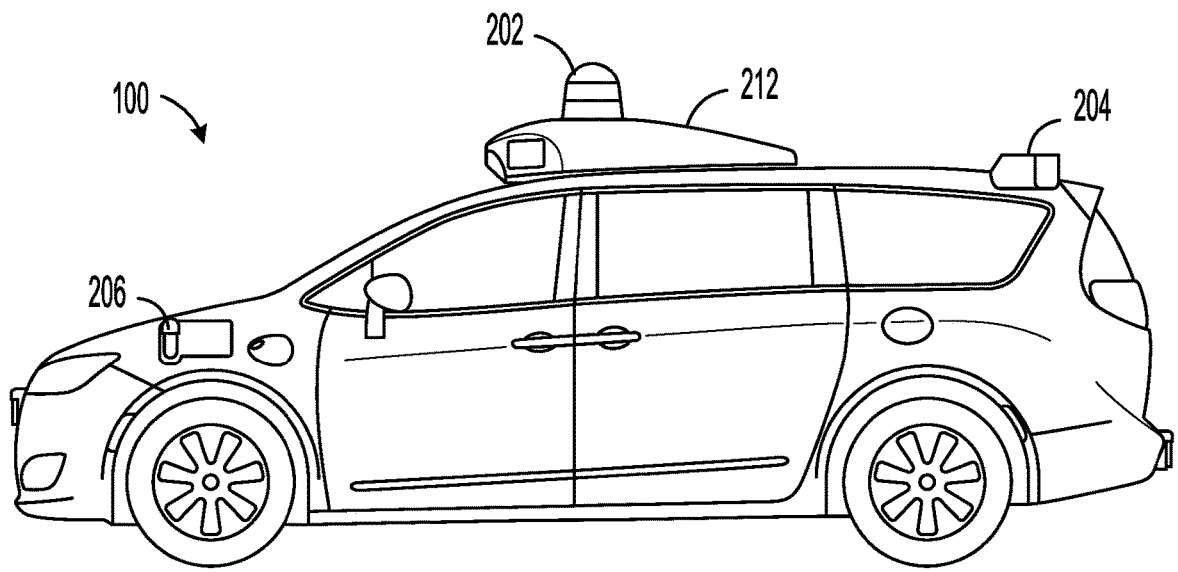
FIG. 2A illustrates a side view of a vehicle, according to one or more example embodiments.
Figure 2B:
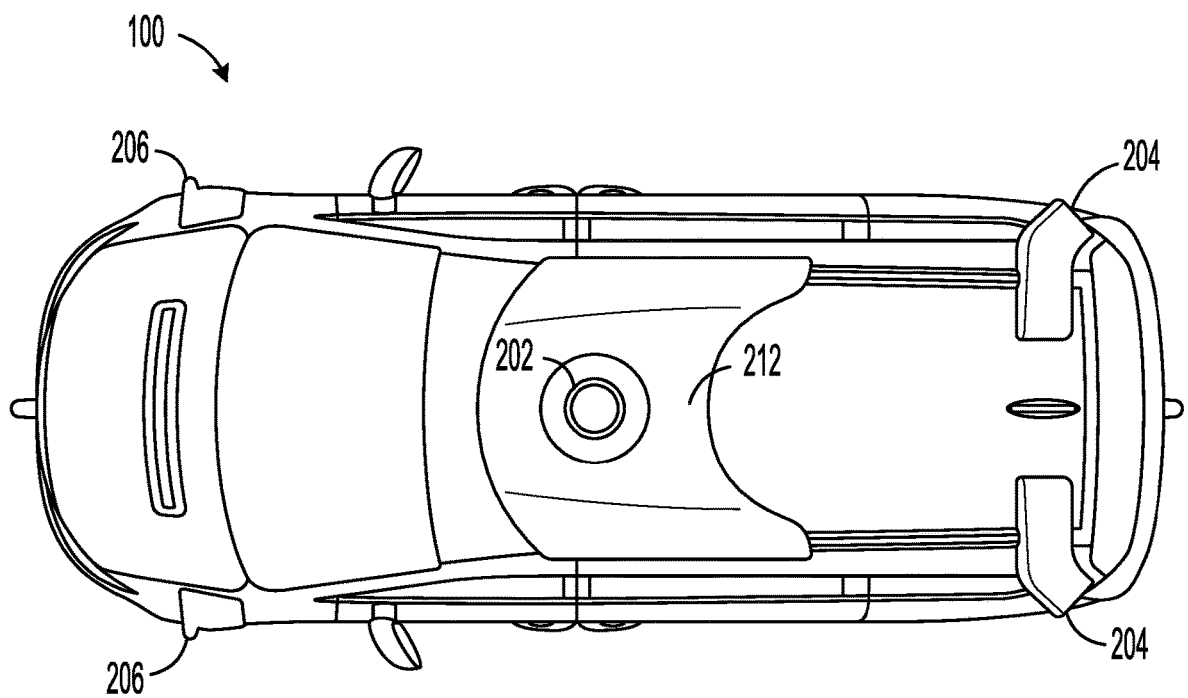
FIG. 2B illustrates a top view of a vehicle, according to one or more example embodiments.
Figure 2C:
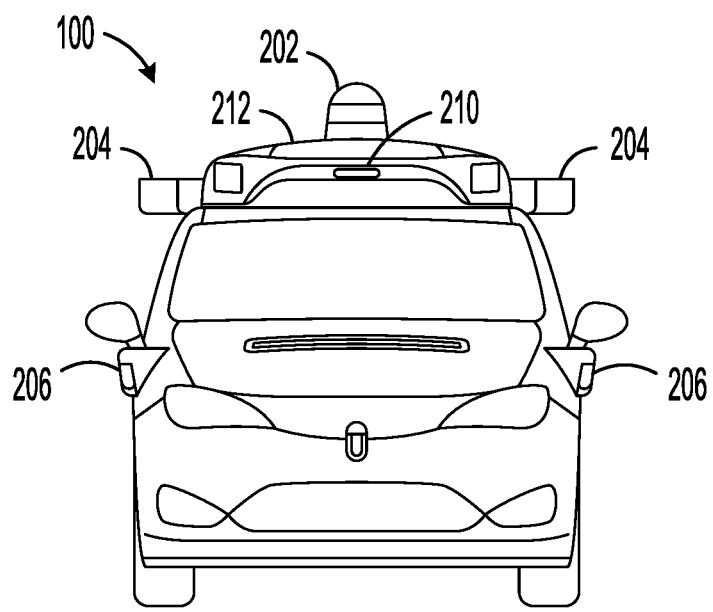
FIG. 2C illustrates a front view of a vehicle, according to one or more example embodiments.
Figure 2D:
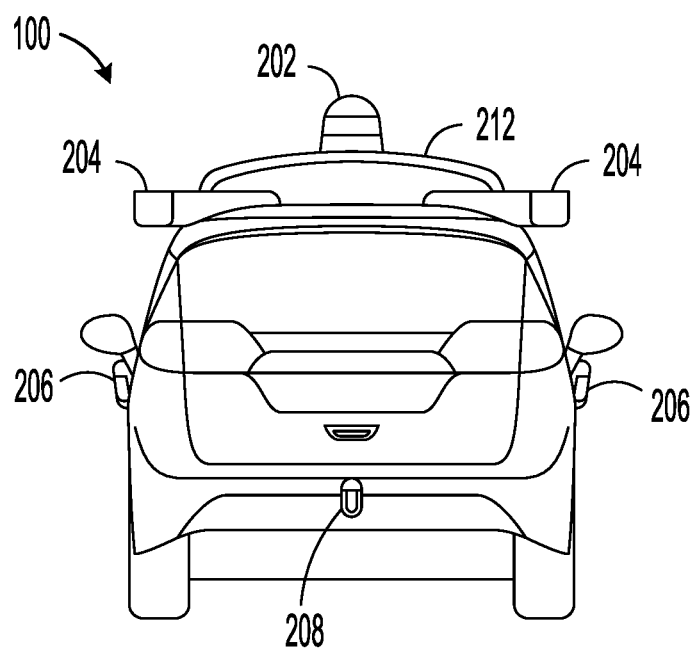
FIG. 2D illustrates a back view of a vehicle, according to one or more example embodiments.
Figure 2E:
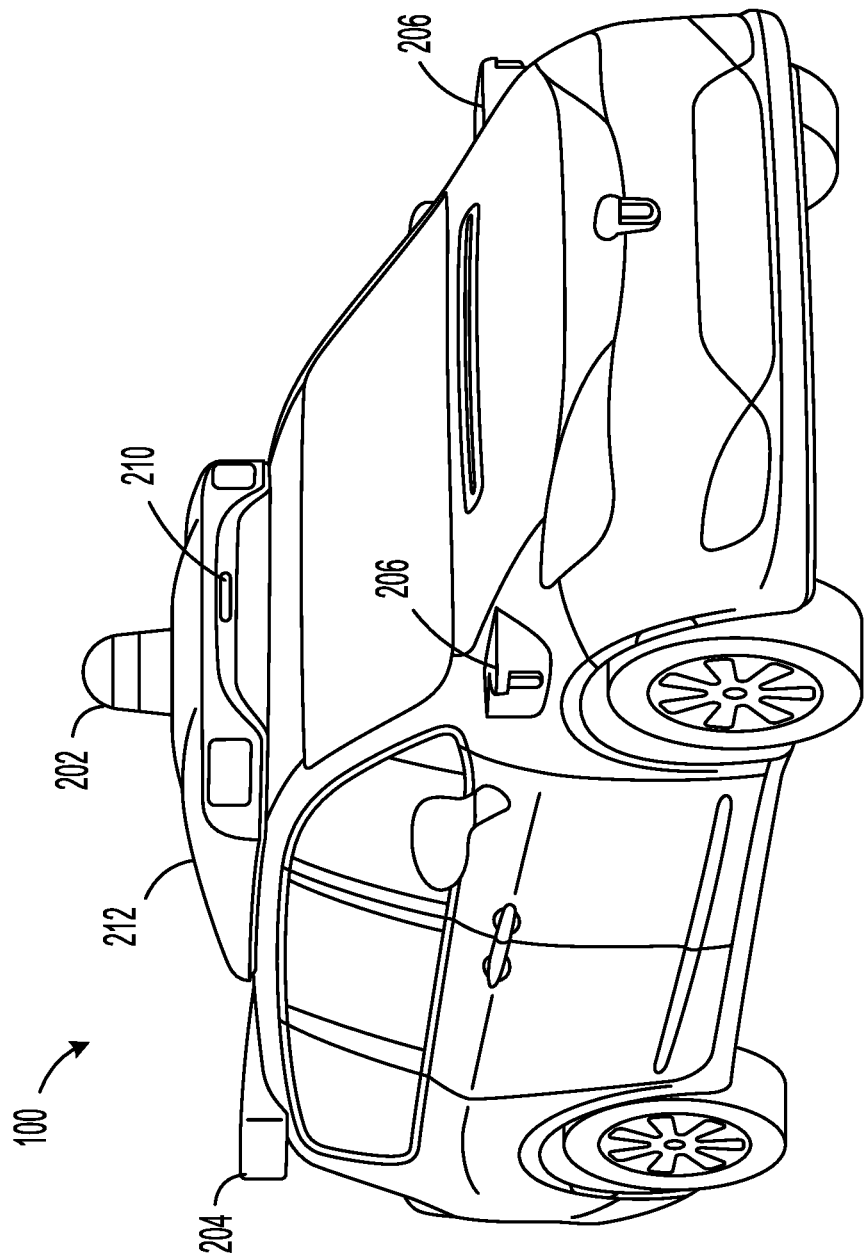
FIG. 2E illustrates an additional view of a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Example embodiments presented herein relate to modular TCUs with multiple cellular radios and techniques for using a modular TCU with multiple cellular radios to enhance the connectivity of a vehicle. A modular TCU can perform similar operations as a conventional TCU, but with a modular configuration that incorporates electric components into a single device. In particular, a modular TCU may incorporate both radios and corresponding antennas that enable vehicle connectivity within a single housing structure configured to connect to different types of vehicle in an interchangeable manner.

The housing of a modular TCU can organize and protect internal components and may also include connection elements that allow the TCU to be attached to a portion of a vehicle (e.g., the roof) and subsequently removed from the vehicle. For example, the housing may include through holes or other elements for fasteners to connect the TCU to the vehicle or another component located on the vehicle (e.g., connect to a sensor pod located on the vehicle). In some instances, an adhesive may be used to position the TCU onto a vehicle.

The type and combination of electrical components within example modular TCUs can vary and may depend on the desired performance for the TCU. Example components within a modular TCU may include multiple radios, antennas, processors, memory, and other components. By way of example, a modular TCU may include six radios and nine antennas. The six radios may include a pair of cellular radios, a Wi-Fi radio, and three Bluetooth low energy (BLE) radios. Each cellular radio may be configured to establish a wireless connection with a different network using corresponding cellular transmission and reception antennas. As a result, the TCU can establish wireless connections with multiple networks simultaneously. For instance, each cellular subsystem may wireless communicate via a network associated with a particular carrier. By including multiple cellular subsystems, the modular TCU can minimize downtime that can arise when a network is unavailable during navigation of a vehicle.

Within the example modular TCU, the Wi-Fi radio may be coupled to a set of antennas and configured to provide a Wi-Fi network. The Wi-Fi network may enable passenger devices to connect to the Internet and/or a local area network within the vehicle. For example, the Wi-Fi subsystem may establish a connection to the Internet through one of the cellular subsystems, which may involve switching to overcome connectivity issues that can arise during navigation.

In addition, the modular TCU may include BLE technology. In some embodiments, a heat sink positioned within the TCU may adjust operation of the BLE technology. Particularly, the heat sink can cause an omnidirectional BLE antenna to operate in a particular direction extending from the TCU. The heat sink can serve as a reflector for one or more BLE antennas to limit operation in particular directions. As a result, BLE technology can be used by the TCU to detect the presence of a passenger's device and a location of the device relative to the vehicle.

To enable the modular design, the antennas may be located within a threshold distance from the radios inside the TCU's housing. In some embodiments, an antenna is 5 to 10 millimeters (mm) from the corresponding radio inside the TCU. The antennas and radios can be in a small area (e.g., 5-10 square millimeters). The threshold distance between radios and antennas may depend on the size and configuration of the TCU's housing. As such, by locating antennas internally within the housing, a modular TCU can be easily installed and uninstalled on various types of vehicles. In addition, the minimal distance between the antennas and corresponding radios and processing components reduces any loss during transmission and reception, which is a problem that impacts conventional TCUs that have antennas positioned remotely from other components.

There are challenges that can arise when implementing cellular, Wi-Fi, and BLE technologies within compact modular device. To overcome these challenges, example embodiments may use component arrangements that minimize interference between the different technologies and enable reliable operation. For instance, some example modular TCUs use a single printed circuit board (PCB) to connect and organize components. Using a single PCB to organize components offers several advantages. The TCU's components can be coupled to each other and collocated on a single PCB, which can make manufacturing and assembly more efficient. For example, the radios, antennas, processors, and other components that enable operations of the TCU may be collocated on a single PCB that can be protected by the TCU's housing. In addition, the use of a single PCB can help minimize the overall size of the TCU.

The arrangement of components on the PCB can further enable and enhance operations of the different technologies provided by the TCU. In particular, example modular TCUs may use a unique design to enable the pair of cellular radios to operate effectively with all four antennas internal in the housing and along with other technologies, such as Wi-Fi and BLE. In some examples, all onboard components and non-antenna metal components are positioned within a threshold distance from the center of the PCB to leave a periphery (i.e., an external border) on the PCB with no copper for the installation of the antennas. As a result, each radio may be coupled within a threshold distance from the PCB's center and each antenna may be coupled at the exterior border extending outside the threshold distance from the PCB's center.

In addition, in order to increase spatial diversity and isolation, the cellular transmission antennas may be positioned orthogonal to each other (i.e., perpendicular) on the PCB. Spatial diversity and isolation can improve the quality and reliability of each wireless link. In some embodiments, by using two separate antennas for transmit and receive functions, a modular TCU can eliminate the need for a duplexer and also protect sensitive receiver components from high power used in transmit. The TCU may also utilize a specific RF design with high pass and low pass filters on relevant chains in order to meet regulatory specifications and further enhance coexistence performance. Furthermore, the heat sink within the TCU may be used as an electromagnetic interference (EMI) shield for the components inside the housing. The TCU may also include one or more parasitic element plates positioned strategically to enhance antenna operations. For instance, a TCU may include two parasitic element plates coupled on the upper portion of the housing and connected to ground via the modems. The two parasitic element plates may increase isolation between the cellular antennas (e.g., LTE antennas).

Referring now to the figures, FIG. 1 is a functional block diagram illustrating example vehicle 100. Vehicle 100 may represent a vehicle capable of operating fully or partially in an autonomous mode. More specifically, vehicle 100 may operate in an autonomous mode without human interaction (or reduced human interaction) through receiving control instructions from a computing system (e.g., a vehicle control system). As part of operating in the autonomous mode, vehicle 100 may use sensors (e.g., sensor system 104) to detect and possibly identify objects of the surrounding environment in order to enable safe navigation. In some implementations, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, user interface 116, and TCU 160. The subsystems and components of vehicle 100 may be interconnected in various ways (e.g., wired or wireless connections). In other examples, vehicle 100 may include more or fewer subsystems. In addition, the functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, one or more electric motors, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheel.

Transmission 120 may transmit mechanical power from the engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, one or more radar units 126, laser rangefinder/LIDAR unit 128, camera 130, steering sensor 123, and throttle/brake sensor 125, among other possible sensors. In some implementations, sensor system 104 may also include sensors configured to monitor internal systems of the vehicle 100 (e.g., 02 monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects (e.g., radar signals), including the speed and heading of the objects, within the local environment of vehicle 100. As such, radar unit 126 may include one or more radar units equipped with one or more antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, the angle of the gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

TCU 160 may be a module that enables connectivity for vehicle 100. TCU 160 may be implemented as any of the example embodiments described herein. For example, TCU 160 may include multiple cellular radios that enable vehicle 100 to connect to different networks simultaneously. In addition, TCU 160 may have a modular design with antennas for the cellular radios as well as other technologies (e.g., Wi-Fi, BLE) positioned within a housing of TCU 160. As such, TCU 160 may be coupled to vehicle 100 and also subsequently removed from vehicle 100. When coupled to vehicle 100, TCU 160 may connect to other vehicle systems, such as control system 106 and power supply 110, among others.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors. Further, computing system 112 may also perform operations with data from TCU 160.

Although FIG. 1 shows various components of vehicle 100, i.e., wireless communication system 146, computer system 112, data storage 114, user interface 116, and TCU 160 as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A, 2B, 2C, 2D, and 2E illustrate different views of a physical configuration of vehicle 100. The various views are included to depict example sensor positions 202, 204, 206, 208, 210, and 212 on vehicle 100. In other examples, sensors can have different positions on vehicle 100. Although vehicle 100 is depicted in FIGS. 2A-2E as a van, vehicle 100 can have other configurations within examples, such as a truck, a car, a semi-trailer truck, a motorcycle, a bus, a shuttle, a golf cart, an off-road vehicle, robotic device, or a farm vehicle, among other possible examples.

As discussed above, vehicle 100 may include sensors coupled at various exterior locations, such as sensor positions 202-212. Vehicle sensors can include one or more types of sensors with each sensor configured to capture information from the surrounding environment or perform other operations (e.g., communication links, obtain overall positioning information). For example, sensor positions 202-212 may serve as locations for any combination of one or more cameras, radars, LIDARs, range finders, one or more TCUs or other radio devices (e.g., Bluetooth and/or 802.11), and acoustic sensors, among other possible types of sensors. In some examples, a TCU (e.g., TCU 160) may be coupled to vehicle 100 at one of the sensor positions 202-212, such as sensor position 212 positioned on the roof of vehicle 100.

Various mechanical fasteners may be used to couple sensors and other components to vehicle 100, including permanent or non-permanent fasteners, adhesives, and other types of coupling elements. For example, bolts, screws, clips, latches, rivets, anchors, and other types of fasteners may be used. In some examples, one or more sensors may be coupled to vehicle 100 using adhesives. In further examples, a sensor may be designed and built as part of the vehicle components (e.g., parts of the vehicle mirrors).

In some implementations, one or more sensors may be positioned at sensor positions 202-212 using movable mounts operable to adjust the orientation of one or more sensors. A movable mount may include a rotating platform that can rotate sensors so as to obtain information from multiple directions around vehicle 100. For instance, sensor position 202 may include a movable mount that enables rotation and scanning within a particular range of angles and/or azimuths. As such, vehicle 100 may include mechanical structures that enable one or more sensors and/or a TCU to be mounted atop the roof of vehicle 100. Additionally, other mounting locations are possible within examples.

Figure 3:
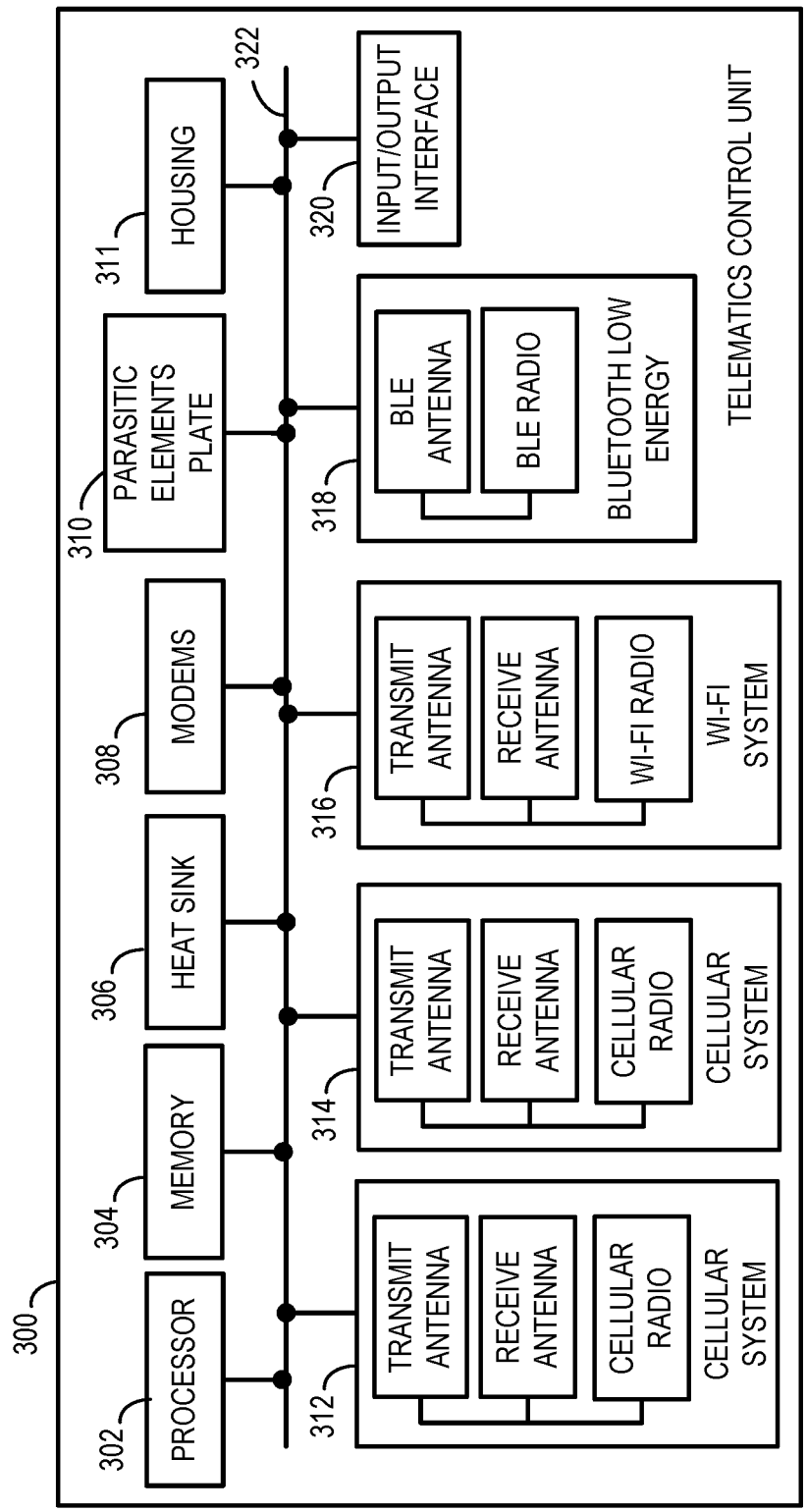
FIG. 3 is a functional block diagram illustrating a modular TCU, according to one or more example embodiments.

FIG. 3 is a block diagram for a TCU, according to one or more example embodiments. As shown, TCU 300 includes processor 302, memory 304, heat sink 306, modems 308, parasitic element plates 310, housing 311, cellular system 312, cellular system 314, Wi-Fi system 316, BLE 318, and input/output interface 320, all of which may be coupled by a system bus 322 or a similar mechanism. In other embodiments, TCU 300 can include more or fewer components. Components can be combined or removed in other embodiments as well. In addition, one or more components may be located external TCU 300 in additional embodiments. For example, TCU 300 may receive operation instructions from an external processor.

Processor 302 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 302 may be one or more single-core processors. In other cases, processor 302 may be one or more multi-core processors with multiple independent processing units. Processor 302 may also include register memory for temporarily storing instructions being executed and related data, as well as cache memory for temporarily storing recently-used instructions and data. In some examples, TCU 300 may include a combination of processors. In addition, TCU 300 may also perform operations based on inputs from one or more external processors, such as a vehicle navigation system or mobile devices positioned within the vehicle.

Memory 304 may include one or more volatile, non-volatile, removable, and/or non-removable storage components, such as magnetic, optical, or flash storage, and/or can be integrated in whole or in part with processor 302. As such, memory 304 may take the form of a non-transitory computer-readable storage medium, having stored thereon program instructions (e.g., compiled or non-compiled program logic and/or machine code) that, when executed by processor 302, cause components of TCU 300 to perform one or more acts and/or functions, such as those described in this disclosure. TCU 300 can be configured to perform one or more acts and/or functions, such as those described in this disclosure. Such program instructions can define and/or be part of a discrete software application. In some instances, processor 302 can execute program instructions in response to receiving an input, such as from vehicle navigation system. Memory 304 may also store other types of data, such as those types described in this disclosure. In some embodiments, TCU 300 may use external memory. For example, components within TCU 300 may use memory within another vehicle system.

Heat sink 306 can cool TCU 300 by dissipating heat from one or more components. For example, heat sink 306 can include aluminum or copper that acts as a passive heat exchanger by transferring heat within TCU 300 to a fluid medium. The quantity and configuration of heat sink 306 can vary in example embodiments. For example, TCU 300 can include a single heat sink that is positioned relative to electrical components that operate more effectively at controlled temperatures.

Heat sink 306 can also be used to enhance the operation of one or more wireless communication technologies operating within TCU 300. For instance, heat sink 306 may have a structure and position that can serve as an EMI shield to prevent interference (or help reduce interference) between antennas associated with different components (e.g., cellular systems 312-314). In addition, heat sink 306 can cause BLE 318 to operate in a particular direction relative to TCU 300. In particular, heat sink 306 can function as a reflector that directs an omnidirectional BLE antenna in the particular direction and blocks transmission in other directions. Heat sink 306 can also function as a thermal connection or electrical connection.

Modems 308 may represent one or more components configured to convert data into a format suitable for transmission medium for transmission from one device to another. Modems 308 may modulate one or more carrier wave signals to encode digital information for transmission and demodulates signals to decode the transmitted information. For example, each cellular 312, 314 may use a modem (e.g., a mobile broadband) to convert data transmitted to and received from the corresponding network.

Parasitic element plates 310 can include one or more plates configured with parasitic elements that increase isolation between components within TCU 300, such as the cellular antennas. For example, TCU 300 includes two parasitic element plates positioned on the upper cover of the housing. Each parasitic element plate 310 may be grounded via a connection through modems 308 (or through another component) and can be positioned to increase isolation between the cellular antennas.

Housing 311 is a physical structure that protects components within TCU 300 and can be coupled to a portion of a vehicle (or another component located on the vehicle). The size, material, configuration, and other aspects of housing 311 can vary. For example, housing 311 can have a box structure, which may be further divided into multiple portions that connect together during assembly. Housing 311 may consist of plastic, metal, or other materials. The material(s) selected may have properties that minimize interference with antenna operations. In some embodiments, housing 311 may be created via additive manufacturing or another type of three dimensional (3D) printing techniques.

Cellular systems 312, 314 can establish wireless connections with external networks. Each cellular system 312, 314 may include a cellular radio configured to use a specific transmit antenna and receive antenna to establish a connection with an external network. Through cellular systems 312, 314, TCU 300 may establish connections with multiple networks simultaneously. In some instances, cellular system 312 may connect and communicate via one carrier's network while cellular system 314 establishes another connection through a different carrier's network. Example mobile technologies used by cellular systems 312, 314 may include, but are not limited to 2G, Global System for Mobile Communication (GSM), 3G, CDMA2000, 4G, LTE, LTE Advanced Pro, WiMax, and 5G, among others. Vehicle systems may use one or both cellular systems 312, 314 to communicate with other devices via one or more external networks (e.g., the Internet).

Wi-Fi system 316 enables TCU 300 to provide wireless networking technologies based on the IEEE 802.11 family of standards. For example, through a connection established by cellular system 312 or cellular system 314, Wi-Fi system 316 may enable vehicle devices and/or mobile devices positioned within the vehicle (e.g., passenger devices) to connect to the Internet. In some instances, Wi-Fi system 316 may switch between cellular systems 312-314 to reduce potential downtime that can occur during navigation. In addition, Wi-Fi system 316 may provide a local area network (LAN) for vehicle devices and/or devices within the vehicle. Wi-Fi system 316 as well as other components may enforce passwords to allow use and/or modification. Wi-Fi system 316 may include a Wi-Fi radio configured to use a corresponding transmit antenna and receive antenna.

BLE is a wireless technology standard used for exchanging data between devices over short distances using short-wavelength UHF radio waves and can build personal area networks (PANs). BLE system 318 may be used to establish communication between vehicle systems and other devices, such as passenger devices charging stations, information kiosks, and traffic signals, among others. For example, a vehicle navigation system may communicate with a passenger device through BLE system 318.

BLE system 318 may include a BLE radio and a BLE antenna to establish wireless communication over short distances. As discussed above, heat sink 306 can act as an EMI shield and cause the BLE antenna to operate in a particular direction. In some embodiments, TCU 300 may include multiple BLE systems 318 with each BLE system configured to communicate in a particular direction away from the vehicle. A vehicle system can estimate a general location of another device relative to the vehicle based on which BLE system is facilitating the wireless communication. The location estimation feature can enhance autonomous operations and safety, including assisting with the detection and connection with charging stations, detection of traffic signs, and factoring passenger locations into navigation strategy based on the estimated locations of passengers' devices.

In some embodiments, one or more BLE system(s) 318 may be positioned under heat sink 306 within TCU 300. In such a position, BLE system(s) 318 may be located proximate the roof of the vehicle when TCU 300 is coupled to the vehicle's roof to allow wireless communication between devices located inside the vehicle (e.g., a passenger's smartphone) during navigation.

Input/output interface 320 can be used to input data into TCU 300 and output data from TCU 300. For example, input/output interface 320 can input operation instructions to process 302 or other components within TCU 300. In addition, input/output interface 320 can output data from components within TCU 300. In other embodiments, TCU 300 may include other components. For example, TCU 300 may include a power adapter that enables components within TCU 300 to receive power from an external source, such as a vehicle power supply.

Figure 4A:
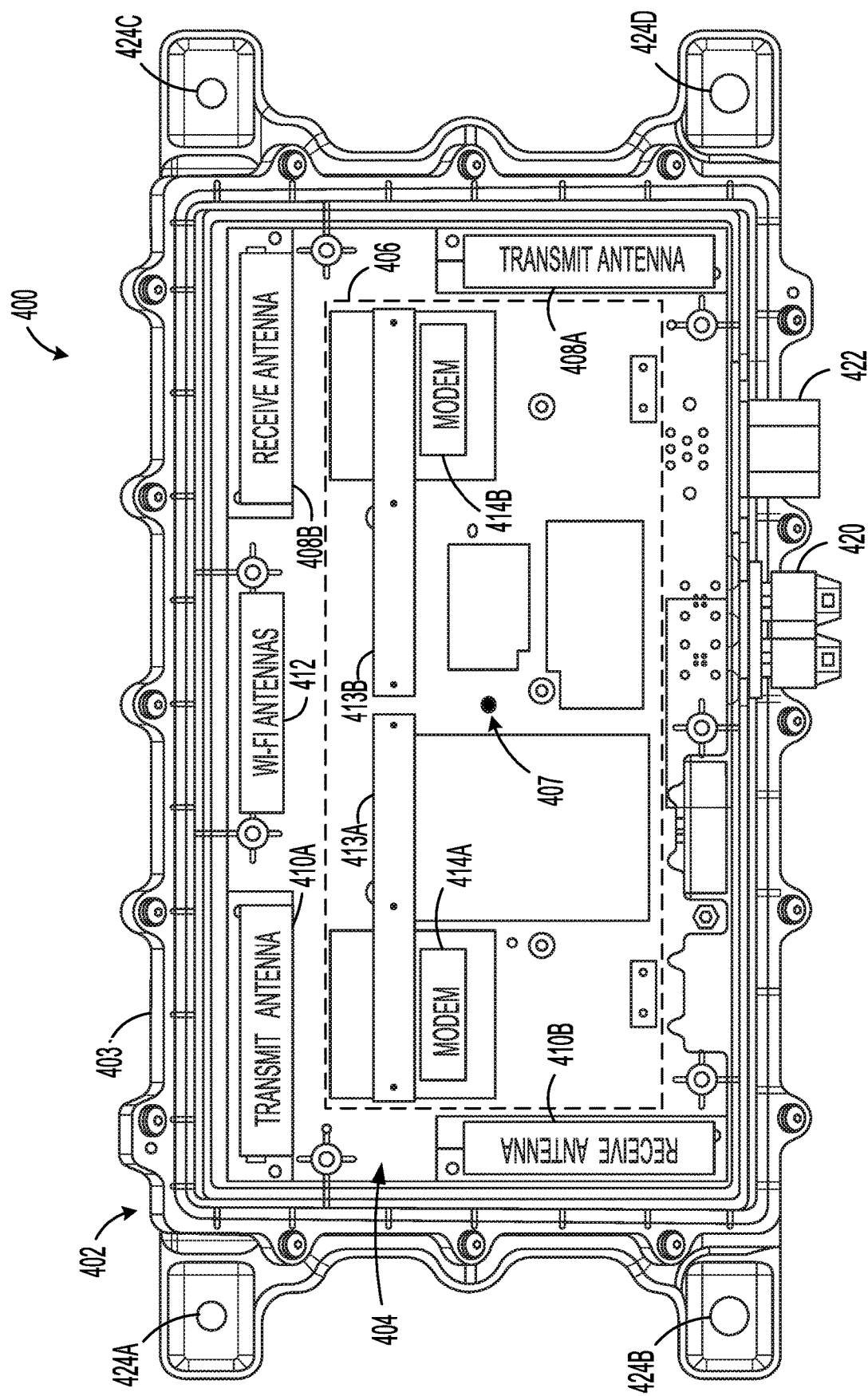
FIG. 4A illustrates a top view of a modular TCU layout, according to one or more example embodiments.

FIG. 4A illustrates a top view inside TCU 400, which shows an example arrangement for internal components. The arrangement of internal components is designed to enable effective operation of the various wireless technologies included within TCU 400. Other embodiments may involve different components in other potential arrangements.

TCU 400 may include the components included in the block diagram for TCU 300 shown in FIG. 3. Housing 402 may provide structure and protect internal components. In the embodiment shown in FIGS. 4A-4B, housing 402 has a box configuration divided to create bottom portion 403 and top portion 405. Bottom portion 403 and top portion 405 are configured to couple together (e.g., screw together) and provide protection to internal components of TCU 400.

Housing 402 further includes through holes 424A, 424B, 424C, 424D. Through holes 424A-424D may enable housing 402 to be coupled to a vehicle, such as vehicle 100. For example a set of screws or other fasteners may be used to couple housing 402 to a portion of a vehicle or another component positioned on a vehicle (e.g., within a sensor pod coupled to the vehicle). In the embodiment shown in FIGS. 4A-4B, housing 402 is made out of plastic and is approximately 150-200 millimeters wide and approximately 350-400 millimeter long. In other embodiments, the material, size, and configuration can differ.

In addition, TCU 400 is shown with components collocated on a single PCB 404. Non-antenna components are shown coupled within area 406 of PCB 404. By having non-antenna components positioned within a threshold distance from center 407 of PCB 404 (i.e., within area 406), an external border of PCB 404 is formed without any metal connections (e.g., copper) between non-antenna components. As a result, the external border of PCB 404 is suitable for the installation of antennas, such as transmit antennas 408A, 410A, receive antennas 408B, 410B, and Wi-Fi antennas 412.

The embodiment shown in FIG. 4A further depicts two pairs of transmit and receive antennas. TCU 400 includes transmit antenna 408A and receive antenna 408B for one cellular system and transmit antenna 410A and receive antenna 410B for another cellular system. To enable effective operation during simultaneous use, Transmit antenna 408A and receive antenna 408A are connected to PCB 404 at one side while transmit antenna 410A and receive antenna 410A are connected on the other. In the illustrated embodiment, each pair of cellular transmission and reception antennas has approximately 25 to 75 millimeters between the antennas. There is also approximately 150-200 millimeters between transmit antenna 410A and receive antenna 408B. These distances can differ in other embodiments and can depend on the size of PCB 404 and the arrangement of components on PCB 404. In addition, transmit antennas 408A, 410A are also shown in an orthogonal arrangement at opposite corners of PCB 404 to increase spatial diversity and isolation between them. Similarly, receive antennas 408B, 410B are orthogonal and located at opposite corners of PCB 404 to achieve similar effects. TCU 400 may also include one or more filters. For instance TCU 400 may include one or more high pass filter and low pass filters coupled on relevant chains relative to transmit antennas 408A, 410A, and receive antennas 410A, 410B. These filters may be included to meet regulatory specifications.

The top view also shows Wi-Fi antennas 412 coupled to the exterior border of PCB 404 between transmit antenna 410A and receive antenna 408B. As discussed above, a TCU's Wi-Fi may include a Wi-Fi radio and a corresponding transmit and receive set of antennas (e.g., Wi-Fi antennas 412).

TCU 400 also includes modems 414A, 414B coupled to PCB 404 within area 406, data connector 420 and power connector 422. Modems 414A, 414B can perform operations similar to radios in some embodiments. In addition, TCU 400 also includes parasitic element plates 413A, 413B, which can assist with signal management and reduce interference during operation of transmit antennas 408A, 410A, receive antennas 408A, 410B, Wi-Fi antennas 412 and other components within TCU 400.

Data connector 420 may enable TCU 400 to communicate with other devices, such as a vehicle navigation system or other computing systems. For instance, data connector 420 can allows data input and output from TCU 400. Power connector 422 may enable TCU 400 to receive power from an external source. For example, power connector 422 can enable TCU 400 to connect to a vehicle power source.

Figure 4B:
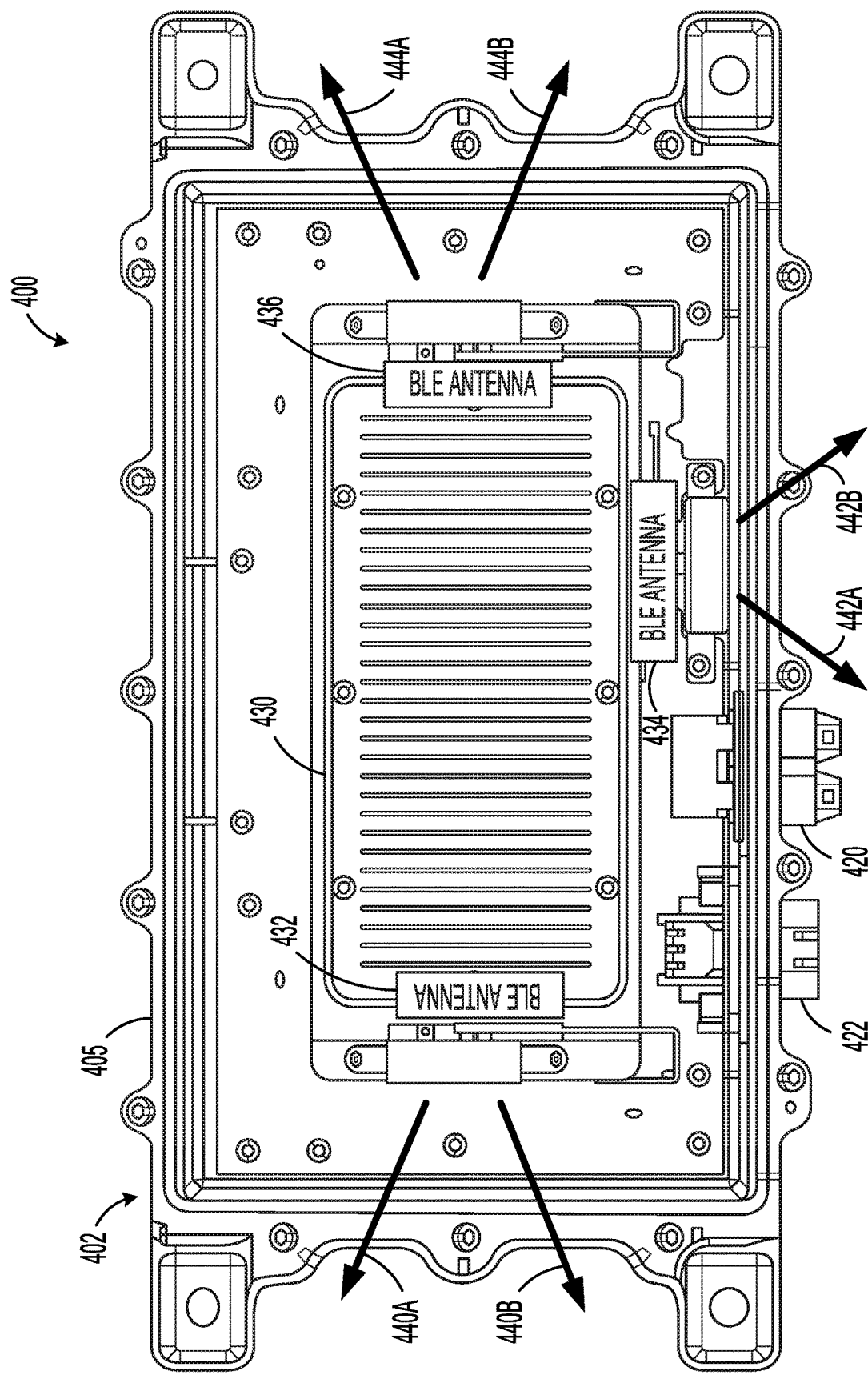
FIG. 4B illustrates a bottom view of the modular TCU layout, according to one or more example embodiments.

FIG. 4B illustrates a bottom view of TCU 400, which depicts an example arrangement for heat sink 430, BLE antennas 432, 434, 436, and other components that are coupled to the bottom side of PCB 404. The bottom view depicts the bottom side of PCB 404 positioned within top portion 405 of housing 402. As indicated above, bottom portion 403 and top portion 405 may connect together to form housing 402 and protect internal components.

Heat sink 430 is shown with a rectangular configuration and coupled to a bottom side of PCB 404. In the embodiment shown in FIG. 4B, heat sink 430 is positioned to cause each BLE antenna 432-436 to operate in a particular direction extending from TCU 400. More specifically, BLE antenna 432 is directed to generally operate in the direction between arrow 440A, 440B, BLE antenna 434 is directed to generally operate in the direction between arrow 442A, 442B, and BLE antenna 436 is directed to generally operate in the direction represented between arrows 444A, 44B. In addition, one or more BLE antennas 432-436 can communicate with a device located within vehicle when TCU 400 coupled to the vehicle (e.g., to the vehicle's roof). For instance, BLE antenna 432 may communicate with a passenger's smartphone as the passenger travels within the vehicle. Another perspective of data connector 420 and power connector 422 are shown in FIG. 4B.

Figure 5:
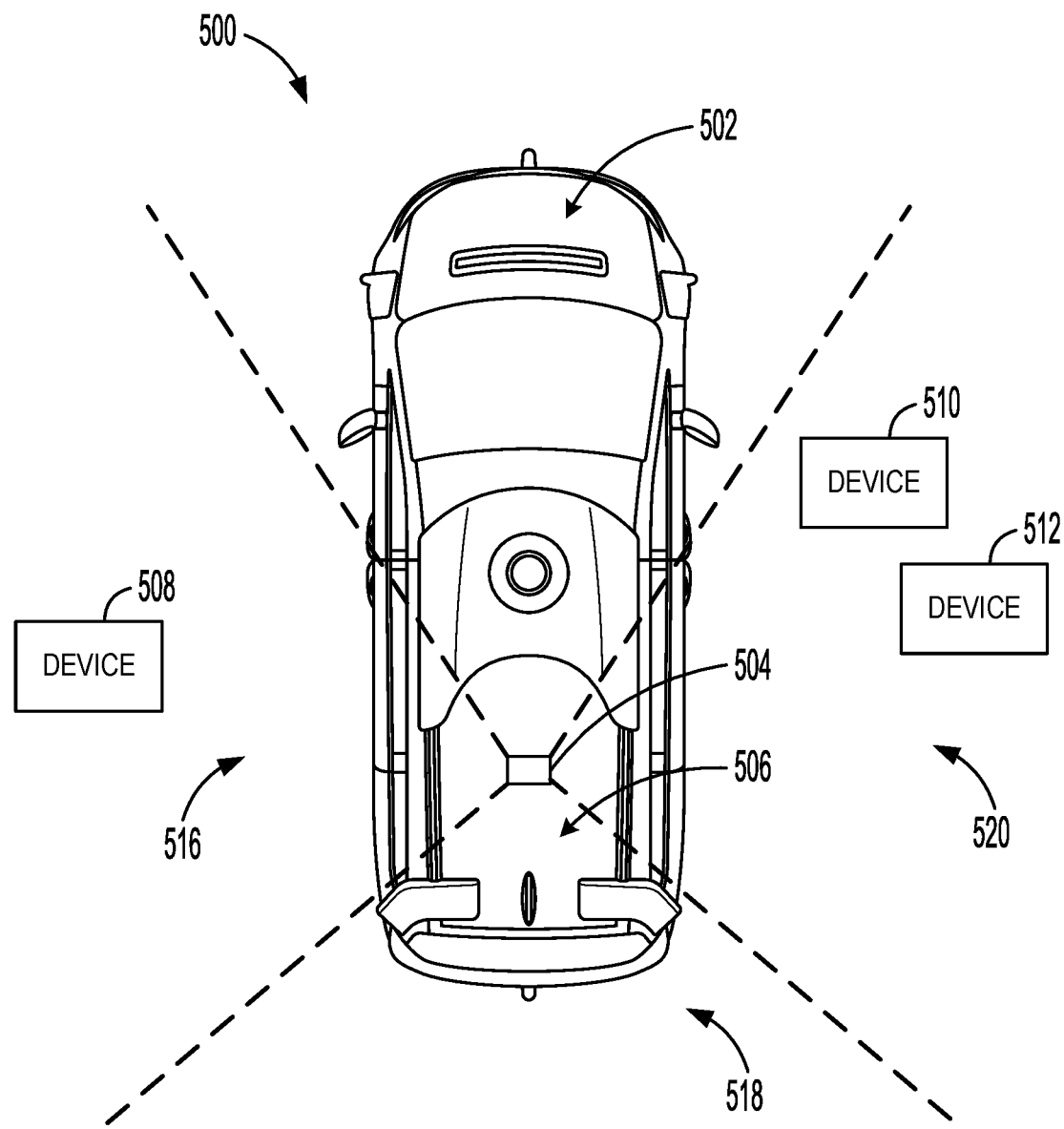
FIG. 5 depicts a TCU enabling vehicle systems to communicate with external devices using BLE, according to one or more example embodiments.

FIG. 5 depicts TCU 500 enabling vehicle systems to communicate with external devices using BLE. Scenario 500 shows TCU 504 coupled to roof 506 of vehicle 502 and using BLE technology to establish short-distance wireless communication with devices 508, 510, 512 located outside vehicle 502. In other embodiments, TCU 504 can be located at another position on vehicle 502.

BLE technology from TCU 504 may vehicle systems to wirelessly communicate with devices 508-512, which can be any type of device capable of communicating via BLE. For example, devices 508-512 may be passenger devices (e.g., smartphones, tablets, wearable computing devices), information kiosks, traffic components (e.g., signs or signals), and charging stations.

In scenario 500, TCU 504 includes three BLE antennas configured to communicate with devices in particular regions 516, 518, 520, respectively. As discussed above, a heat sink within TCU 504 can cause omnidirectional BLE antennas to operate only in one of the three example regions 516, 518, 520. For example, one BLE radio and antenna combination from TCU 504 may be configured to communicate with devices (e.g., device 508) primarily in a left region 516 relative to vehicle 502 while another combo communicates with devices (e.g., devices 510, 512) located in a right region 520. In addition, the third BLE may communicate with devices located in region 518 behind vehicle 502.

The vehicle navigation system and other components of vehicle 502 may use BLE to determine navigation strategies and to enhance the experience of passengers. For example, BLE from TCU 504 may be used to selectively unlock vehicle doors based on a location of a passenger device relative to vehicle 502. Other BLE uses are possible.

Figure 6:
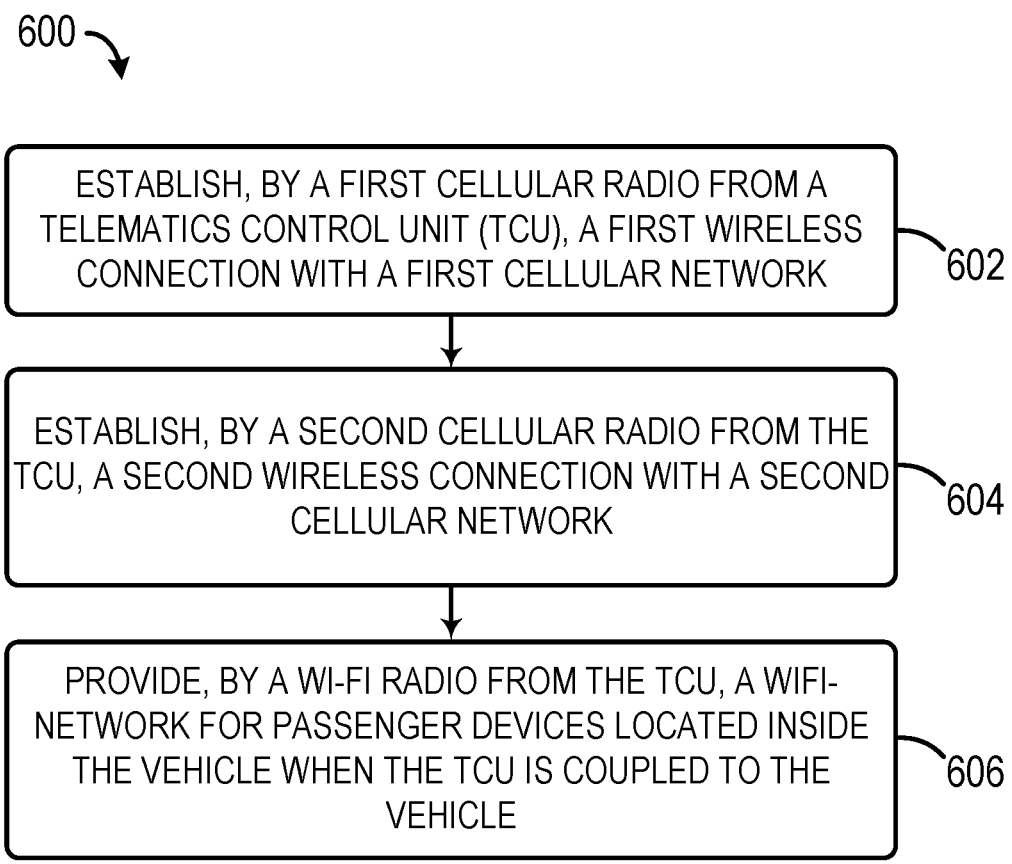
FIG. 6 is a flow chart of a method for enhancing vehicle connectivity using a modular TCU, according to one or more example embodiments.

FIG. 6 is a flowchart of method 600 for enhancing vehicle connectivity using a modular TCU. Method 600 represents an example method that may include one or more operations, functions, or actions, as depicted by one or more of blocks 602, 604, and 606, each of which may be carried out by any of the systems shown in FIGS. 1-5 and FIG. 7, among other possible systems. For example, any of the TCUs described herein may perform method 600 or similar methods. In addition, the TCU may include one or more processors to cause other components to perform operations described herein. For instance, a processor within the TCU may cause a radio to establish a wireless connection. In some embodiments, external systems (e.g., a vehicle system) may use components within a modular TCU to perform method 600.

Those skilled in the art will understand that the flowchart described herein illustrate functionality and operation of certain implementations of the present disclosure. In this regard, each block of the flowchart may represent a module, segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrently or in reverse order, depending on the functionality involved, as would be understood by those reasonably skilled in the art. In examples, a computing system may cause a processor from a TCU to perform one or more blocks of method 600.

At block 602, method 600 involves establishing, by a first cellular radio from a TCU, a first wireless connection with a first cellular network. The TCU can include multiple radios and multiple antennas positioned within a housing that is configured to couple to a vehicle. In some embodiments, the multiple radios and antennas are collocated to a PCB located within the housing. For example, the antennas can be positioned within a threshold distance from the radios within the housing with the threshold distance based on reducing losses during transmission and reception between radios and corresponding antennas.

In addition, the first cellular radio may use a first cellular transmission antenna and a first cellular reception antenna from the multiple antennas to establish the first wireless connection with the first cellular network.

At block 604, method 600 involves establishing, by a second cellular radio from the TCU, a second wireless connection with a second cellular network. The second cellular radio may use a second cellular transmission antenna and a second cellular reception antenna from the multiple antennas to establish the second wireless connection with the second cellular network.

At block 606, method 600 involves providing, by a Wi-Fi radio from the TCU, a Wi-Fi network for passenger devices located inside the vehicle when the TCU is coupled to the vehicle. The Wi-Fi radio may use a set of Wi-Fi antennas from the multiple antennas to provide the Wi-Fi network. In some examples, providing the Wi-Fi network involves using the first wireless connection with the first cellular network or the second wireless connection with the second cellular network.

In some examples, method 600 may further involve establishing, by a BLE radio from the TCU, a wireless connection with a given passenger device. The BLE radio may use a antenna operating in a particular direction to establish the wireless connection with the given passenger device. In addition, method 600 may also involve communicating via the first wireless connection with the first cellular network and via the second wireless connection with the second cellular network simultaneously.

Figure 7:
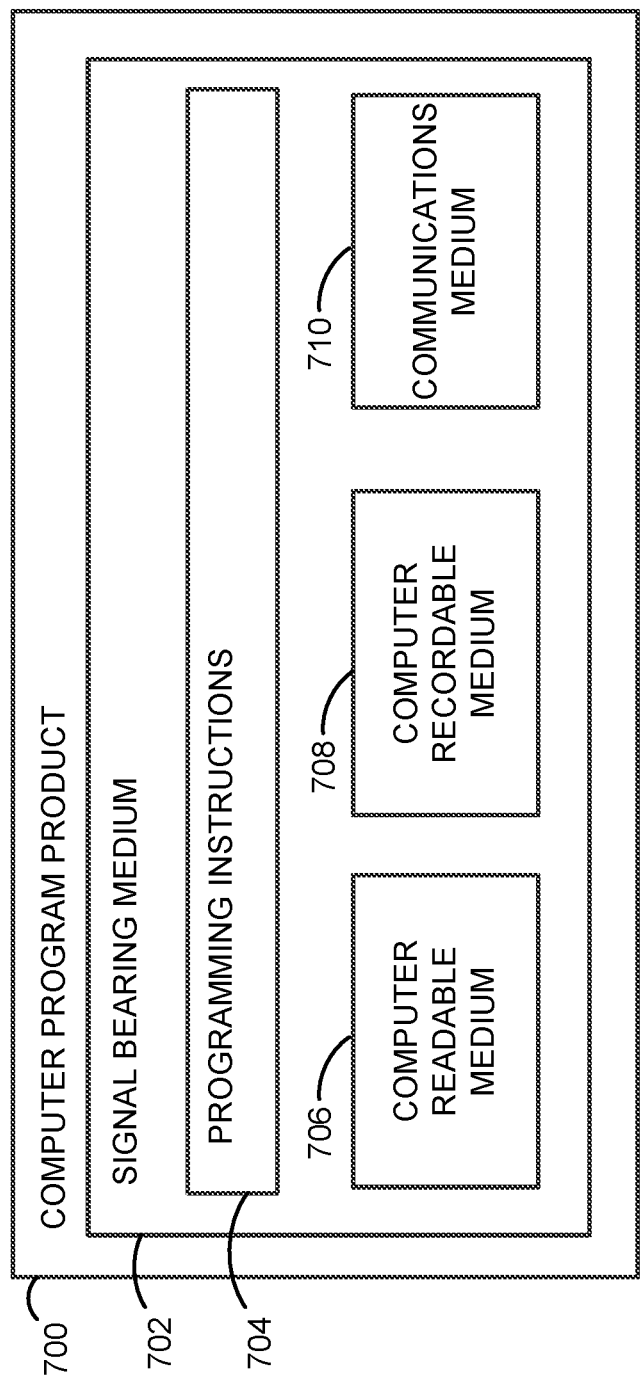
FIG. 7 illustrates a schematic diagram of a computer program, according to example embodiments.

FIG. 7 is a schematic illustrating a conceptual partial view of an example computer program product that includes a computer program for executing a computer process on a computing device, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

In one embodiment, example computer program product 700 is provided using signal bearing medium 702, which may include one or more programming instructions 704 that, when executed by one or more processors may provide functionality or portions of the functionality described above with respect to FIGS. 1-6. In some examples, the signal bearing medium 702 may encompass a non-transitory computer-readable medium 1606, such as, but not limited to, a hard disk drive, a Compact Disc (CD), a Digital Video Disk (DVD), a digital tape, memory, etc. In some implementations, the signal bearing medium 702 may encompass a computer recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the signal bearing medium 702 may be conveyed by a wireless form of the communications medium 710.

The one or more programming instructions 704 may be, for example, computer executable and/or logic implemented instructions. In some examples, a computing device such as the computer system 112 of FIG. 1 may be configured to provide various operations, functions, or actions in response to the programming instructions 704 conveyed to the computer system 112 by one or more of the computer readable medium 706, the computer recordable medium 708, and/or the communications medium 710. Other devices may perform operations, functions, or actions described herein.

The non-transitory computer readable medium could also be distributed among multiple data storage elements, which could be remotely located from each other. The computing device that executes some or all of the stored instructions could be a vehicle, such as vehicle 100 illustrated in FIGS. 1-2E. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A system comprising:
 a plurality of antennas;
 a plurality of radios; and
 a housing configured to couple to a vehicle, wherein the plurality of antennas and the plurality of radios are collocated on a printed circuit board (PCB) positioned within the housing, and wherein the plurality of radios includes:
  (i) a first cellular radio configured to establish a first wireless connection with a first cellular network using a first cellular transmission antenna and a first cellular reception antenna from the plurality of antennas;
  (ii) a second cellular radio configured to establish a second wireless connection with a second cellular network using a second cellular transmission antenna and a second cellular reception antenna from the plurality of antennas;
  (iii) a Wi-Fi radio coupled to a set of antennas from the plurality of antennas and configured to provide a Wi-Fi network for passenger devices located inside the vehicle when the housing is coupled to the vehicle; and
  (iii) one or more Bluetooth low energy (BLE) radios, wherein each BLE radio is coupled to an antenna from the plurality of antennas.

2. The system of claim 1, wherein the plurality of antennas is positioned within a threshold distance from the plurality of radios within the housing.

3. The system of claim 2, wherein the threshold distance is based on reducing losses during transmission and reception between the plurality of radios and the plurality of antennas.

4. The system of claim 1, wherein each radio from the plurality of radios is coupled within a threshold distance from a center of the PCB; and
 wherein each antenna from the plurality of antennas is coupled at an exterior border of the PCB, wherein the exterior border of the PCB is an area beyond the threshold distance from the center of the PCB.

5. The system of claim 4, wherein the first cellular transmission antenna and the second cellular transmission antenna are coupled at the exterior border of the PCB in an orthogonal arrangement,
 wherein the orthogonal arrangement is configured to increase spatial diversity and isolation between the first cellular transmission antenna and the second cellular transmission antenna.

6. The system of claim 5, further comprising:
 one or more parasitic element plates, wherein at least one parasitic element plate is coupled to an upper portion of the housing such that the at least one parasitic element plate increases isolation between the first cellular transmission antenna, the first cellular reception antenna, the second cellular transmission antenna, and the second cellular reception antenna.

7. The system of claim 6, wherein the at least one parasitic element plate comprises:
 a first parasitic element plate, wherein the first parasitic element plate is connected to ground via a first coupling with a first modem; and
 a second parasitic element plate, wherein the second parasitic element plate is connected to ground via a second coupling with a second modem.

8. The system of claim 7, wherein the first modem and the second modem are coupled to PCB within the threshold distance from the center of the PCB.

9. The system of claim 1, further comprising:
 at least a high pass filter and a low pass filter, wherein the high pass filter and the low pass filter are configured to enhance coexistence of the first cellular transmission antenna, the first cellular reception antenna, the second cellular transmission antenna, and the second cellular reception antenna.

10. The system of claim 1, further comprising:
 a heat sink configured to dissipate heat from one or more components located within the housing.

11. The system of claim 10, wherein the one or more BLE radios comprises:
 three BLE radios, wherein each antenna corresponding a BLE radio from the three BLE radios is arranged relative to the heat sink such that the antenna is configured to operate in a particular direction relative to the housing.

12. The system of claim 11, wherein at least one BLE radio of the three BLE radios is configured to communicate with a given passenger device located within the vehicle when the housing is coupled to the vehicle.

13. The system of claim 1, wherein the plurality of antennas includes nine antennas positioned within the housing; and
 wherein the plurality of radios comprises six radios configured to operate simultaneously.

14. The system of claim 13, wherein the plurality of antennas and the plurality of radios are coupled to a printed circuit board (PCB) located within the housing.

15. A method comprising:
 establishing, by a first cellular radio from a telematics control unit (TCU), a first wireless connection with a first cellular network, wherein the TCU includes a plurality of radios and a plurality of antennas collocated on a printed circuit board (PCB) positioned within a housing that is configured to couple to a vehicle, and wherein the first cellular radio uses a first cellular transmission antenna and a first cellular reception antenna from the plurality of antennas to establish the first wireless connection with the first cellular network; and
 establishing, by a second cellular radio from the TCU, a second wireless connection with a second cellular network, wherein the second cellular radio uses a second cellular transmission antenna and a second cellular reception antenna from the plurality of antennas to establish the second wireless connection with the second cellular network; and
 providing, by a Wi-Fi radio from the TCU, a Wi-Fi network for passenger devices located inside the vehicle when the TCU is coupled to the vehicle, wherein the Wi-Fi radio uses a set of antennas from the plurality of antennas to provide the Wi-Fi network.

16. The method of claim 15, further comprising:
 establishing, by a Bluetooth low energy (BLE) radio from the TCU, a wireless connection with a given passenger device, wherein the BLE radio uses an antenna to establish the wireless connection with the given passenger device.

17. The method of claim 15, further comprising:
 communicating via the first wireless connection with the first cellular network and via the second wireless connection with the second cellular network simultaneously; and wherein providing the Wi-Fi network for passenger devices located inside the vehicle when the TCU is coupled to the vehicle comprises:

providing the Wi-Fi network using the first wireless connection with the first cellular network or the second wireless connection with the second cellular network.

18. A non-transitory computer readable medium having stored therein instructions executable by one or more processors to cause a telematics control unit (TCU) to perform operations comprising:

establishing, by a first cellular radio from the TCU, a first wireless connection with a first cellular network, wherein the TCU includes a plurality of radios and a plurality of antennas collocated on a printed circuit board (PCB) positioned within a housing that is configured to couple to a vehicle, and wherein the first cellular radio uses a first cellular transmission antenna and a first cellular reception antenna from the plurality of antennas to establish the first wireless connection with the first cellular network; and establishing, by a second cellular radio from the TCU, a second wireless connection with a second cellular network, wherein the second cellular radio uses a second cellular transmission antenna and a second cellular reception antenna from the plurality of antennas to establish the second wireless connection with the second cellular network; and providing, by a Wi-Fi radio from the TCU, a Wi-Fi network for passenger devices located inside the vehicle when the TCU is coupled to the vehicle, wherein the Wi-Fi radio uses a set of antennas from the plurality of antennas to provide the Wi-Fi network.

* * * * *